Dec. 3, 1940.  C. H. IHDE  2,224,051
PLANTER ATTACHMENT
Filed Nov. 7, 1939  2 Sheets—Sheet 1
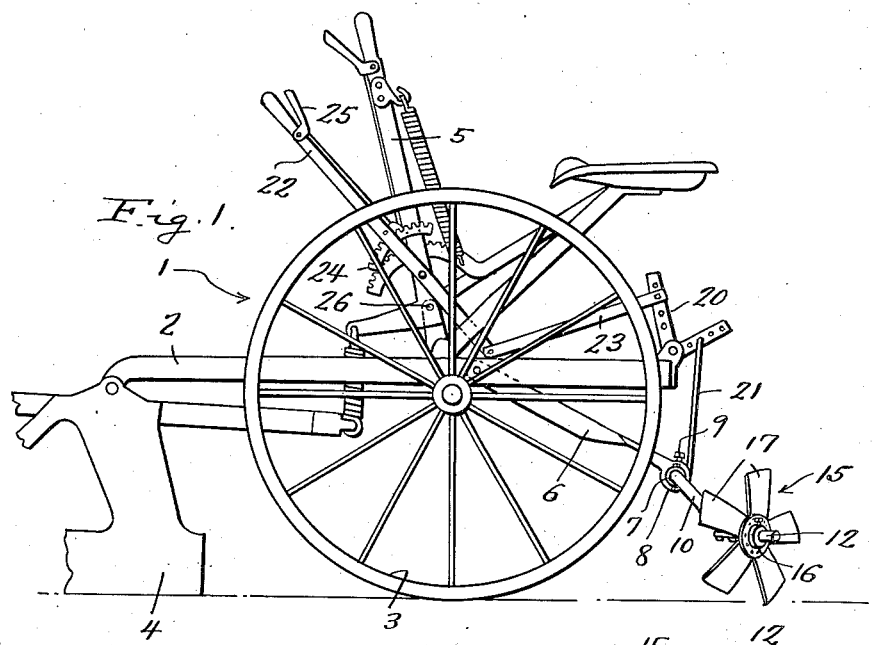
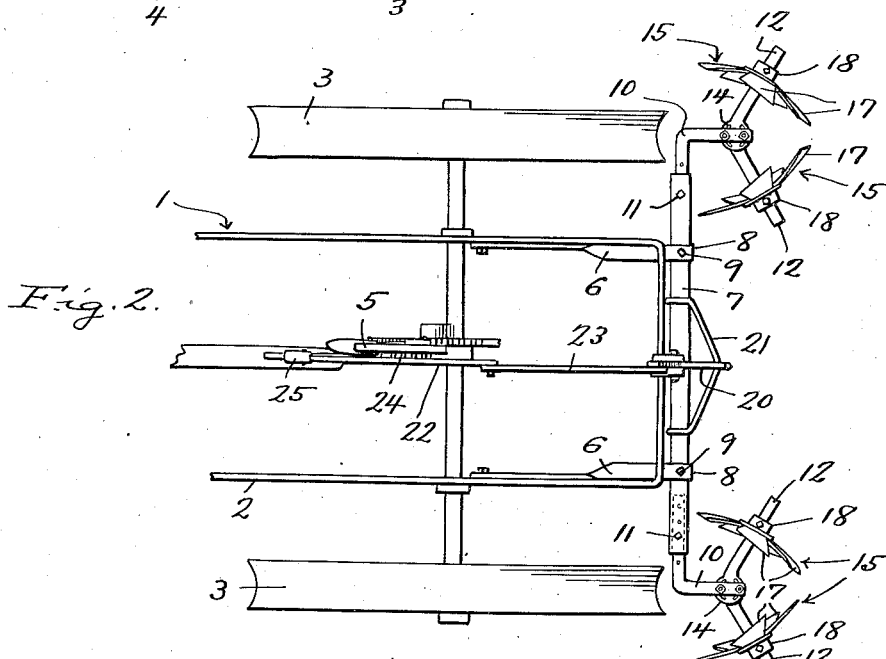
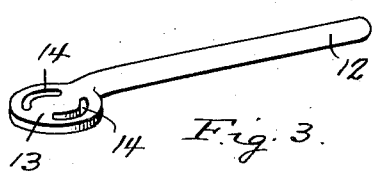
Inventor
CHRISTIAN H IHDE
By Clarence A. O'Brien
and Hyman Berman
Attorneys Dec. 3, 1940.   C. H. IHDE   2,224,051
PLANTER ATTACHMENT
Filed Nov. 7, 1939    2 Sheets-Sheet 2
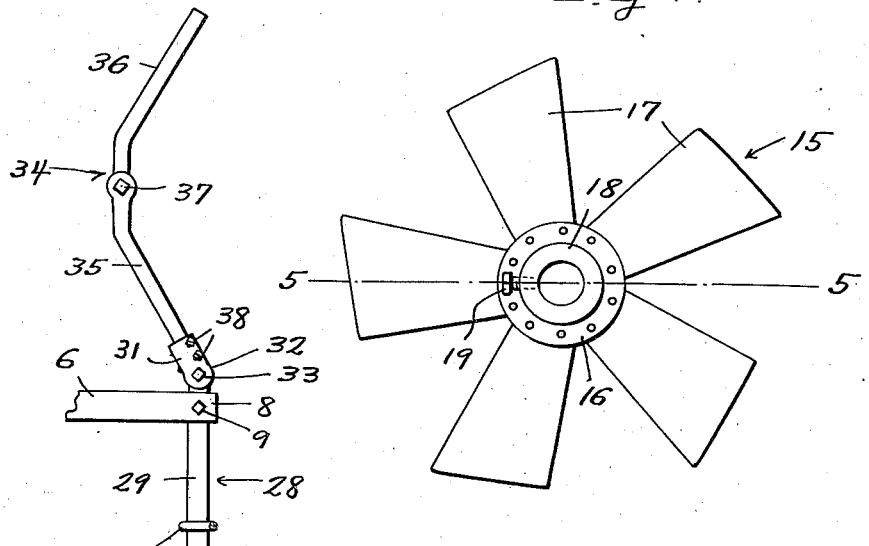
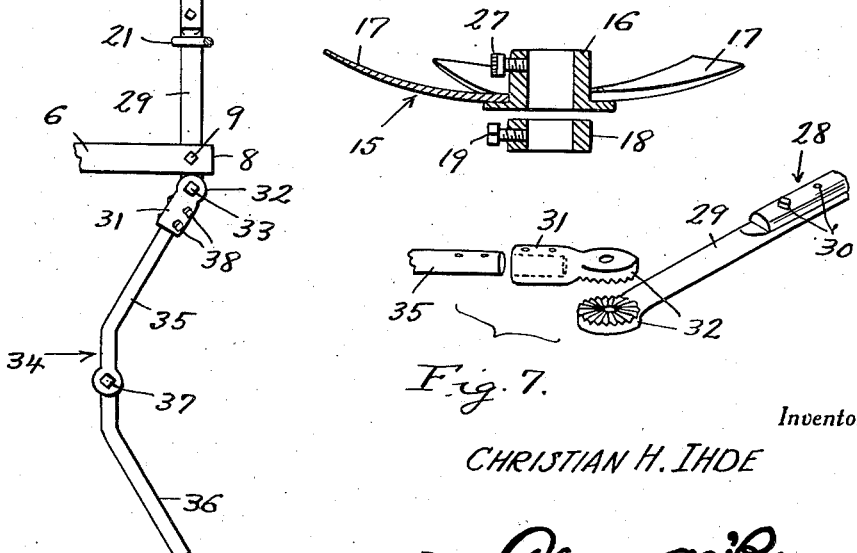
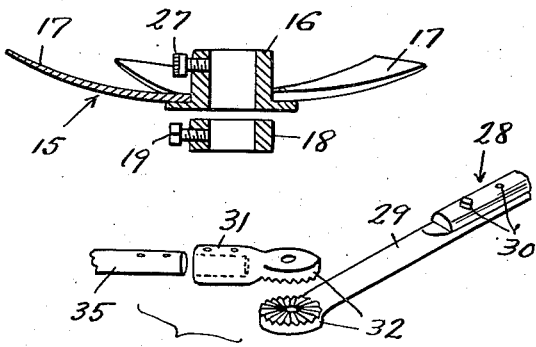
Inventor
CHRISTIAN H. IHDE
By Clarence A. O'Brien
and Hyman Berman
Attorneys Patented Dec. 3, 1940

2,224,051

UNITED STATES PATENT OFFICE 2,224,051

PLANTER ATTACHMENT

Christian H. Ihde, Monona, Iowa

Application November 7, 1939, Serial No. 303,324

7 Claims. (Cl. 97—6)

The present invention relates to new and useful improvements in attachments for corn planters and other agricultural implements of the wheel supported type and has for its primary object to provide, in a manner as hereinafter set forth, novel means for covering the tracks left by the wheels and for forming pockets in the soil for retaining water or moisture and preventing erosion.

Another very important object of the invention is to provide an attachment of the aforementioned character for agricultural machines embodying a novel construction and arrangement whereby the earth working elements may be conveniently raised, lowered and adjusted as desired.

Still another very important object of the invention is to provide an attachment of the character described which may be expeditiously mounted on a conventional corn planter or other implement without the necessity of making structural alterations therein.

Other objects of the invention are to provide an attachment for agricultural implements which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing an embodiment of the present invention mounted for operation on the rear end of a corn planter.

Figure 2 is a top plan view thereof.

Figure 3 is a detail view in perspective of one of the adjustable disc axles.

Figure 4 is a view in side elevation of one of the multiple blade discs.

Figure 5 is a view in horizontal section, taken substantially on the line 5—5 of Fig. 4.

Figure 6 is a top plan view of a modification.

Figure 7 is a perspective view of a portion of the modification shown in Fig. 6, showing the elements separated.

Referring now to the drawings in detail, it will be seen that the reference numeral 1 designates generally a portion of a conventional corn planter which includes a frame structure 2 mounted on wheels 3. Mounted for raising and lowering on the forward portion of the frame structure 2 is a planter shoe 4 of the usual construction. A hand lever 5 is operatively connected to the shoe for raising and lowering same.

Pivotally mounted for swinging movement on the frame 1 is a pair of rearwardly and downwardly extending arms 6. Mounted on the free ends of the arms 6 is a transversely extending tubular member 7. The arms 6 are provided with eyes 8 on their rear ends in which the tube 7 is secured by set screws 9.

Removably and adjustably mounted in the end portions of the tube 7 are angular bars 10. Bolts 11 secure the angular bar 10 in adjusted position in the tube 7. Mounted for swinging adjustment on the free end portions of the bars 7 are diverging axles 12. As best seen in Fig. 3 of the drawings, the axles 12 are formed to provide discs 13 on one end having arcuate slots 14 therein which accommodate bolts for securing said axles in adjusted position on the bars 10.

Mounted for rotation and sliding adjustment on the axles 12 are pairs of rearwardly converging discs which are designated generally by the reference numeral 15. Referring now to Figs. 4 and 5 of the drawings, it will be observed that the discs 15 include flanged hubs 16 having mounted thereon a plurality of blades 17. Collars 18 are provided on the axles 12 for retaining the discs 15 in adjusted position. The collars 18 are secured in adjusted position by set screws 19.

Mounted on the rear end portion of the frame structure 2 is a bell crank lever 20. Adjustably mounted on one end portion of the bell crank lever 20 is a substantially V-shaped hanger 21 the ends of which are connected to the tube 7. Pivotally mounted on the planter lever 5 is a hand lever 22. A link 23 operatively connects the bell crank lever 20 to the hand lever 22. Rigidly mounted on the planter lever 5 is a toothed segment 24. A latch 25 on the lever 22 is engageable with the segment 24 for releasably locking the lever 22 to the planter lever 5 for swinging movement in unison therewith. It will be observed that the lower end of the lever 22, to which the link 23 is connected, extends below the pivot 26 of the planter lever 5.

It is thought that the operation of the device will be readily apparent from a consideration of the foregoing. As the machine travels over the ground the rearwardly converging pairs of discs 15 at the rear of the wheels 3 throw the earth over the tracks left by said wheels. As the discs 15 rotate the spaced blades 17 thereof form pockets or dams along the opposite side portions of the tracks for retaining water or moisture and preventing erosion. By operating the lever 22 independently of the lever 5 the discs 15 may be raised and lowered to operate at the desired depth. With the lever 22 locked against swinging movement to the lever 5 through the medium of the elements 24 and 25, the discs 15 may be raised and lowered simultaneously with the planter shoe 4 by actuating said lever 5. It will be observed that the hanger 21 may be adjusted on the bell crank lever 20, also that the link 23 is adjustably connected to said bell crank lever. By loosening the bolts 11 the angular bars 10 may be conveniently adjusted for machines of different widths or to meet other conditions. This also facilitates removal of the discs 15 from the machine when desired. Through the medium of the collars 18 the pairs of discs 15 may be adjusted toward or away from each other as desired. Then, the adjustable connections of the axles 12 to the angular bars 10 permit the angle of the pairs of discs 15 relative to each other to be conveniently regulated. Suitable grease fittings 27 are provided at desired points, as on the hubs 16, for lubricating the moving parts of the attachment.

Referring now to Figs. 6 and 7 of the drawings, it will be observed that the reference numeral 28 designates generally a transverse bar or member which is mounted on the arms 6. The bar 28 includes a pair of overlapping sections 29 which are adjustably secured together, as at 30.

Mounted for swinging adjustment on the ends of the bar 28 are sockets 31. The outer ends of the bar sections 29 and the socket members 31 are provided with complemental toothed discs 32 (see Fig. 7) which are apertured to accommodate bolts 33.

Mounted in the socket members 31 are removable axles which are designated generally by the reference numeral 34. The axles 34 include angular inner and outer sections 35 and 36, respectively, which are hingedly connected for swinging adjustment relative to each other at 37. The inner axle sections 35 have one end portion removably secured in the socket members 31 by bolts 38.

The operation of the embodiment of the invention shown in Figs. 6 and 7 is substantially similar to the embodiment illustrated in Figs. 1 to 5 of the drawings. It may be well to here state that the discs 15 are journaled on the sections 35 and 36 of the axles 34. Thus, the discs are arranged in rearwardly converging pairs. By lengthening or shortening the sectional bar 28 in the eyes 8 of the arms 6 the discs may be moved inwardly or outwardly for machines of different widths. Through the medium of the hinge connections between the axles 34 and the bar 28 the pairs of discs may be adjusted as a unit. Then, through the medium of the hinge connection 37 between the axle sections 35 and 36 the angle of the pairs of discs relative to each other may be regulated as desired. The discs are rotatable and slidable on the axle sections 35 and 36 as on the axles 12.

It is believed that the many advantages of an agricultural implement attachment constructed in accordance with the present invention will be readily understood and although preferred embodiments of the device are as illustrated and described, it is to be understood that further modifications and changes in the details of construction may be resorted to which will fall within the scope of the invention as claimed.

What is claimed is:

1. In combination with an agricultural implement including supporting wheels, a planting shoe, and a hand lever operatively connected to said shoe for raising and lowering same, a plurality of discs mounted for vertical adjustment on the implement, a lever pivotally mounted on the first named lever and operatively connected to the discs for raising and lowering said discs, and means for securing the second named lever against swinging movement to the first named lever for movement in unison therewith for raising and lowering the discs with the shoe.

2. An attachment for agricultural implements comprising a member mounted transversely on the implement, a bell crank lever pivotally mounted on the implement, a substantially V-shaped hanger adjustably mounted on one end portion of the bell crank lever and having its ends secured to the member, a hand lever pivotally mounted on the implement, a link operatively connecting the bell crank lever to the hand lever for raising and lowering the member, and pairs of discs rotatably and adjustably mounted on the ends of the member.

3. An attachment for agricultural implements comprising a pair of arms pivotally mounted on the implement for swinging movement in a vertical plane, eyes on the free ends of said arms, a transversely extending member mounted in said eyes, pairs of axles mounted for swinging adjustment on the ends of the member, discs journaled on said axles and slidably adjustable thereon, means for securing said discs in adjusted position on the axles, and means connected to the member for manually raising and lowering the discs.

4. An attachment for agricultural implements comprising a tube mounted transversely on the implement, angular bars adjustably mounted in the end portions of said tube, pairs of axles mounted for swinging adjustment on one end portion of the angular bars, discs journaled on said axles and slidably adjustable thereon, and means on the axles for securing the discs in adjusted position.

5. An attachment for agricultural implements comprising a pair of arms mounted for swinging movement in a vertical plane on the implement, eyes on the free ends of the arms, a tube secured in said eyes, angular bars adjustably mounted in the end portions of the tube, pairs of axles mounted on one end portion of said bars, said axles including discs on one end having arcuate slots therein for the reception of securing elements for adjustably attaching the axles to the bars, discs rotatably mounted on the axles and slidably adjustable thereon, and collars adjustably mounted on the axles for retaining the discs in adjusted position on said axles.

6. An attachment for agricultural implements comprising a pair of arms mounted for swinging adjustment on the implement, eyes on the free ends of said arms, an extensible member mounted in said eyes and including a pair of adjustably connected sections, axles mounted for swinging adjustment on the ends of said member, and discs journaled on said axles.

7. An attachment for agricultural implements comprising a member mounted transversely on the implement, axles mounted for swinging adjustment on the end portions of said member, each axle including a pair of angular sections pivotally connected at one end, and discs journaled on the axle sections and slidably adjustable thereon.

CHRISTIAN H. IHDE.